(12) United States Patent
Thorington et al.

(10) Patent No.: US 10,524,335 B1
(45) Date of Patent: Dec. 31, 2019

(54) SYSTEMS AND METHODS FOR REDUCING NETWORK TRAFFIC IN A LIGHTING SYSTEM

(71) Applicant: SYNAPSE WIRELESS, INC., Huntsville, AL (US)

(72) Inventors: Johnny Thorington, Huntsville, AL (US); James Alexander Mabry, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/142,874

(22) Filed: Sep. 26, 2018

(51) Int. Cl.
*H05B 37/02* (2006.01)
*H04W 28/02* (2009.01)
*H04W 4/38* (2018.01)

(52) U.S. Cl.
CPC .... *H05B 37/0272* (2013.01); *H04W 28/0221* (2013.01); *H04W 4/38* (2018.02); *H05B 37/0227* (2013.01)

(58) Field of Classification Search
CPC ............ H05B 37/0218; H05B 37/0227; H05B 37/0245; H05B 37/0272; H05B 37/029
USPC .................................................. 315/152, 312
See application file for complete search history.

(56) References Cited

U.S. PATENT DOCUMENTS

| | | | |
|---|---|---|---|
| 5,996,079 A | 11/1999 | Klein | |
| 6,897,429 B1 | 5/2005 | Turner et al. | |
| 8,368,310 B1 * | 2/2013 | Roosli ............... | H05B 37/0245 315/152 |
| 8,543,505 B2 | 9/2013 | Pederson | |
| 9,374,874 B1 | 6/2016 | Ewing | |
| 9,874,890 B2 | 1/2018 | Lyons | |
| 2012/0299485 A1 * | 11/2012 | Mohan ............... | H05B 37/0218 315/153 |
| 2014/0001846 A1 * | 1/2014 | Mosebrook ......... | H04L 12/2816 307/11 |

* cited by examiner

*Primary Examiner* — Tung X Le
(74) *Attorney, Agent, or Firm* — Maynard Cooper & Gale, P.C.; Jon E. Holland

(57) ABSTRACT

Systems and methods are provided for reducing network traffic in a lighting system. A server computer can calculate the energy consumption of the light sources in the lighting system based on the settings of the lights sources implemented by the server computer and power usage data for the light sources. By calculating the energy consumption at the server computer based on the implemented settings and the power usage data, the server computer does not have to receive communications from the controllers of the light sources indicating the power usage or energy consumption of the light source. The power usage data for the light sources can be updated to enable the server computer to provide more accurate energy consumption information for the lighting system.

21 Claims, 5 Drawing Sheets

SYSTEMS AND METHODS FOR REDUCING NETWORK TRAFFIC IN A LIGHTING SYSTEM

BACKGROUND

The present application generally relates to systems and methods for reducing network traffic in a lighting system by reducing the transmission of power usage messages over the network.

Typically, a lighting system in a facility is controlled by a lighting application or control system. The lighting application can monitor the lighting system and provide instructions to the components of the lighting system (e.g., lighting fixtures) via a network. In addition, the lighting application can be required to provide accurate (e.g., less than 2% error) energy consumption reports for the energy used by the lighting fixtures controlled by local lighting controllers (i.e., a lighting controller located near the lighting fixture).

One technique to determine energy consumption is to have power usage measurements from each lighting controller transmitted at frequent intervals (e.g., 15 min.) to a site controller (or server computer) executing the lighting application. The site controller can use the power measurements from the lighting controllers to derive the energy consumption for the lighting system. When a large number of lighting controllers are used, the reporting of power measurements by the lighting controllers can result in a significant amount of traffic that may increase congestion on the network. The increase in network traffic from the transmission of power measurements by the lighting controllers may limit (or starve out) other lighting application traffic (e.g., communications with photocells, wall switches, or motion sensors) or other industrial control systems trying to share the same network. The increased network congestion may cause sluggish response times or missed events.

SUMMARY

The present application generally pertains to a control system for a lighting system that can reduce network traffic in the lighting system by eliminating the need to communicate power usage messages between lighting controllers and a site controller that then uses the power usage messages for energy consumption calculations. Instead, the site controller can calculate (or estimate) the energy consumption for the lighting system by using the lighting configurations for the light sources applied by the site controller and dynamically updated power profiles that correlate the power usage of a light source with the lighting configuration of the light source. The site controller can use the known lighting configuration for the light source to determine the power usage for the light source at that lighting configuration using the power profile. The site controller can then use the power usage determinations associated with the known lighting configurations of the light sources to calculate the energy consumption for the light sources and the lighting system.

The power profiles (e.g., conversion tables) are generated by the lighting controllers for the light sources and then provided to the site controller for the lighting system. The lighting controllers can measure the power usage of the light sources for some or all of the different settings (e.g., lighting configurations) of the light source. In one embodiment, the lighting controllers can determine the power usage of the light sources for different dim settings (e.g., brightness settings) of the light sources. The power profiles for the light sources can be periodically updated automatically by the lighting controllers to provide "up-to-date" information relating to the power usage of the light sources. The power profiles can be automatically updated in response to preselected events occurring (e.g., system restarts or provisioning changes) and/or in response to a predetermined update schedule (e.g., monthly). In other embodiments, the power profiles can be updated in response to a user command. Once generated, the power profiles can be provided to the site controller by the lighting controllers via the network.

The site controller can calculate (or estimate) the energy consumption for the lighting system (or a portion of the lighting system) by determining the energy consumption for individual light sources in the lighting system and then totaling the energy consumption for the individual light sources. The site controller can determine the energy consumption for an individual light source by determining the power usage by the light source during one or more lighting events known by the site controller (since the site controller sent the command that initiated the lighting event(s)) that occur during the time period for which the energy consumption is desired. The site controller can use the known lighting configuration of the light source for each of the lighting events associated with the light source and determine the power usage for each of the lighting configurations with the power profile. The site controller can then determine the energy consumption for the light source based on the power usage measurements associated with the lighting configurations.

In another embodiment, the lighting controllers can perform self-calibration of the power data of the controller/driver/LED combinations to determine the energy consumption of the lighting system. The lighting controllers can be existing "bolt on" lighting controllers with power monitoring or "next generation" embedded lighting controllers (e.g., the DIM10-087-06 lighting controller from Synapse Wireless) with a "smart" driver having a DALI (Digital Addressable Lighting Interface) interface and power data register information.

After the lighting controller is deployed in the field, the lighting controller cycles through a range of dim setting outputs to the driver and records the power at each setting creating a conversion table that the site controller can upload. The site controller already has knowledge of the configured dim settings used by the lighting controller and can calculate the power and energy consumption with the table. Events in the lighting system may trigger the recalculation and uploading of the tables by the lighting controllers. The events may be related to system startup, provisioning changes, ambient environmental changes or predefined recalibration schedules to compensate for aging. The recalibration events can be scheduled to be performed during off-hours. The lighting control system can monitor for other events like wall switch, photocell, and motion sense activity, as well as scheduled calendar events to complete the final energy calculation.

In a further embodiment, the lighting controller for a light source calibrates the light source from time-to-time (e.g., weekly) by taking a sufficient number of power measurements to characterize the power consumption of the light source over a range of dim settings. Data indicative of such characterization is transmitted to the site controller, which can then accurately estimate power consumption based on the control inputs (e.g., dim settings) provided by the site controller to the lighting controller. Thus, the site controller can accurately estimate power consumption over time without requiring the lighting controller to perform power measurements, thereby obviating the need to communicate power measurement values over the network (except for the small number of measurements needed for periodic calibration). Accordingly, network congestion is reduced. In addition, the periodic calibrations account for the effects of product variations, aging and drift so that accurate results are achievable.

One advantage of the present application is a reduction in network traffic resulting from the site controller determining the energy consumption of a lighting system using conversion tables at the site controller instead from frequent power usage messages from the lighting controllers of the lighting system.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
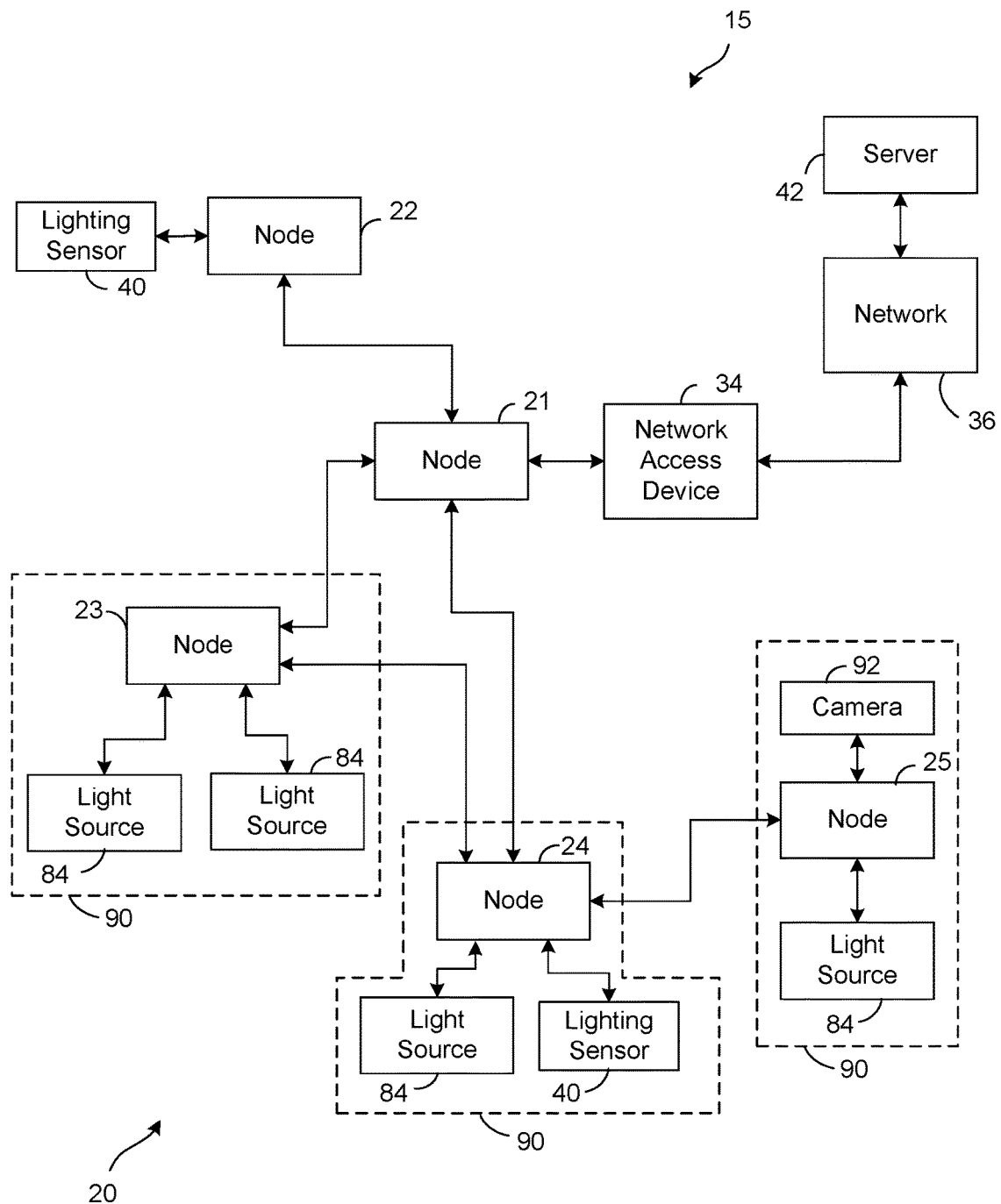
FIG. 1 is a block diagram showing an embodiment of a control system.

FIG. 1 shows an embodiment of a control system 15 at a facility such as a manufacturing plant, office, factory or warehouse. As shown by FIG. 1, the system 15 can include a wireless sensor network 20. In one embodiment, the network 20 can be implemented as a mesh network, but other types of networks may be implemented in other embodiments. Some examples of networks that can be used with the present application are described in: commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

The network 20 can include nodes 21-25 to facilitate communication between a server computer 42 and components of the control system 15. In one embodiment, the nodes 21-25 of the control system 15 can be configured as a lighting control system to control components of a lighting system at the facility. In some embodiments, the nodes 21-25 of the control system may also be configured to operate to perform other functions such as asset tracking or monitoring parameters outside of lighting (e.g., parameters for a pneumatic system). An example of an asset tracking system that can be used with the present application is described in commonly-assigned U.S. Pat. No. 9,619,989, entitled "Asset Tracking Systems and Methods," and granted on Apr. 11, 2017.

The components of the control system 15 can include light sources 84, lighting sensors 40, cameras 92 and any other components used with a lighting control system. In the embodiment of FIG. 1, five nodes 21-25, four light sources 84, two lighting sensors 40 and one camera 92 are depicted for simplicity, but the network 20 may have any number of nodes 21-25, any number of light sources 84, any number of lighting sensors 40 and any number of cameras 92 in other embodiments.

Each node 21-25 is able to communicate with any of the other nodes 21-25. In one embodiment, the nodes 21-25 can communicate among one another wirelessly (i.e., via electromagnetic or acoustic waves carrying a signal), but it is possible for any of the nodes 21-25 to communicate over a conductive medium (e.g., a wire or fiber, or otherwise). In some embodiments, the nodes 21-25 form a mesh network, and messages may hop from node-to-node in order to reach a destination. In the embodiment shown by FIG. 1, nodes 21, 23 and 24 are within range of each other such that any of the nodes 21, 23 and 24 can communicate directly with any of the other nodes 21, 23 and 24. However, node 22 is only within range of node 21 and node 25 is only within range of node 24. Nodes 23-25 can use node 21 to route or otherwise transmit a message to node 22 and nodes 21-23 can use node 24 to route or otherwise transmit a message to node 25.

At least one of the nodes 21-25 can be communicatively coupled to a network access device 34 through which the nodes 21-25 communicate in order to access a network 36, such as a local area network (LAN), wide area network (WAN) or the Internet. The network access device 34 can interface messages between the protocol of the network 20 and the protocol of the network 36. The server 42 can be connected to the network 36 to communicate with the nodes 21-25 and components of the network 20 via the network access device 34. The server 42 can be provisioned to know the network configuration, including the network identifier (e.g., network address) of the nodes 21-25, the light identifier (e.g., light address) of the light sources 84, the camera identifier (e.g., camera address) of the cameras 92 and any other nodes of the network 20. In other embodiments, the server 42 may be configured to dynamically learn the network configuration.

As shown in the embodiment of FIG. 1, the nodes 23-25 can each be coupled to one or more light sources 84 thereby forming a lighting module 90. The light sources 84 generate light that is used to illuminate the area surrounding the light sources 84. In some embodiments, the light source 84 is assembled into a lamp for use with a lighting fixture. As an example, the light source 84 may be implemented by an incandescent bulb, a light emitting diode (LED), or a fluorescent light, or other types of light sources that are assembled into lamps for use in lighting fixtures. Yet other types of light sources are possible in other embodiments.

The nodes 23-25 can be used to control the lighting state (e.g., the on-state or the off-state), the lighting output aperture position (e.g., all light can exit or a reduced quantity of light can exit), and/or the dim setting (e.g., the lighting output intensity or brightness, which can be a high intensity output or a low intensity output) of the corresponding connected light source(s) 84. In one embodiment, the dim setting for the light source 84 can correspond to the brightness of the light illuminated by the light source 84. In addition, the lighting modules 90 may include one or more reflectors that can be adjusted by the nodes 23-25 to change the direction of the light output by the light source 84. Further, the lighting modules 90 may include one or more mechanisms (e.g., a track and motorized trolley) for the light source 84 to permit the position and/or orientation of the light source 84 to be adjusted by the nodes 23-25.

As shown in FIG. 1, the lighting modules 90 can incorporate one or more lighting sensors 40 and/or one or more cameras 92 that are controlled by the corresponding node 23-25 of the lighting module 90. The lighting sensors 40 can include any combination of optical sensors, proximity sensors, infrared sensors, magnetic sensors, touch sensors, height sensors, temperature sensors, pressure sensors, occupancy sensors or any other appropriate type of sensor. In one embodiment, the incorporation of lighting sensors 40 and/or cameras 92 into a lighting module 90 may permit the corresponding node 23-25 of the lighting module 90 to respond directly to certain conditions or events detected by the lighting sensors 40 and/or cameras 92 without having to communicate with the server 42. For example, the detection of a certain condition by lighting sensor 40 (e.g., a person entering a room) may result in the node 23-25 adjusting the light source 84 (e.g., switching the light source 84 to the on-state). However, in other embodiments, detection of certain conditions by lighting sensor 40 are provided to server 42, which then can provide commands to the corresponding node 23-25 to adjust the light source 84.

In one embodiment, the nodes 21-25, light sources 84, lighting sensors 40 and cameras 92 can be stationary. However, in other embodiments, one or more of the nodes 21-25, one or more of the light sources 84, one or more of the lighting sensors 40 and/or one or more of the cameras 92 may be mobile. Each node 21-25, light source 84, lighting sensor 40 and camera 92 may be positioned at a specific location associated with the facility. In one embodiment, the light sources 84 of the lighting modules 90 can be mounted in the ceiling of the facility. However, in other embodiments, the light sources 84 can be mounted at other locations associated with the facility such as on inside or outside walls, under cabinets, in the floor or in any other suitable location. Each node 21-25 may be assigned to a specific location associated with a facility (e.g., a particular room or an inside or outside area of a building).

One or more of the cameras 92 may be automatically rotated or pivoted either horizontally and/or vertically in order to adjust the field of view of the camera 92 without changing the location of the camera 92. Similarly, one or more of the light sources 84 may be automatically rotated or pivoted either horizontally and/or vertically in order to adjust the output direction of the light source 84 without changing the location of the light source 84. In one embodiment, the rotating or pivoting of the cameras 92 and/or light sources 84 may be pre-programmed into the cameras 92 and/or light sources 84 such that the cameras 92 and/or light sources 84 are rotated or pivoted according to a predetermined sequence. In another embodiment, the rotating or pivoting of the cameras 92 and/or light sources 84 may be in response to instructions provided to the cameras 92 and/or light sources 84 by a user or the control system 15.

Figure 2:
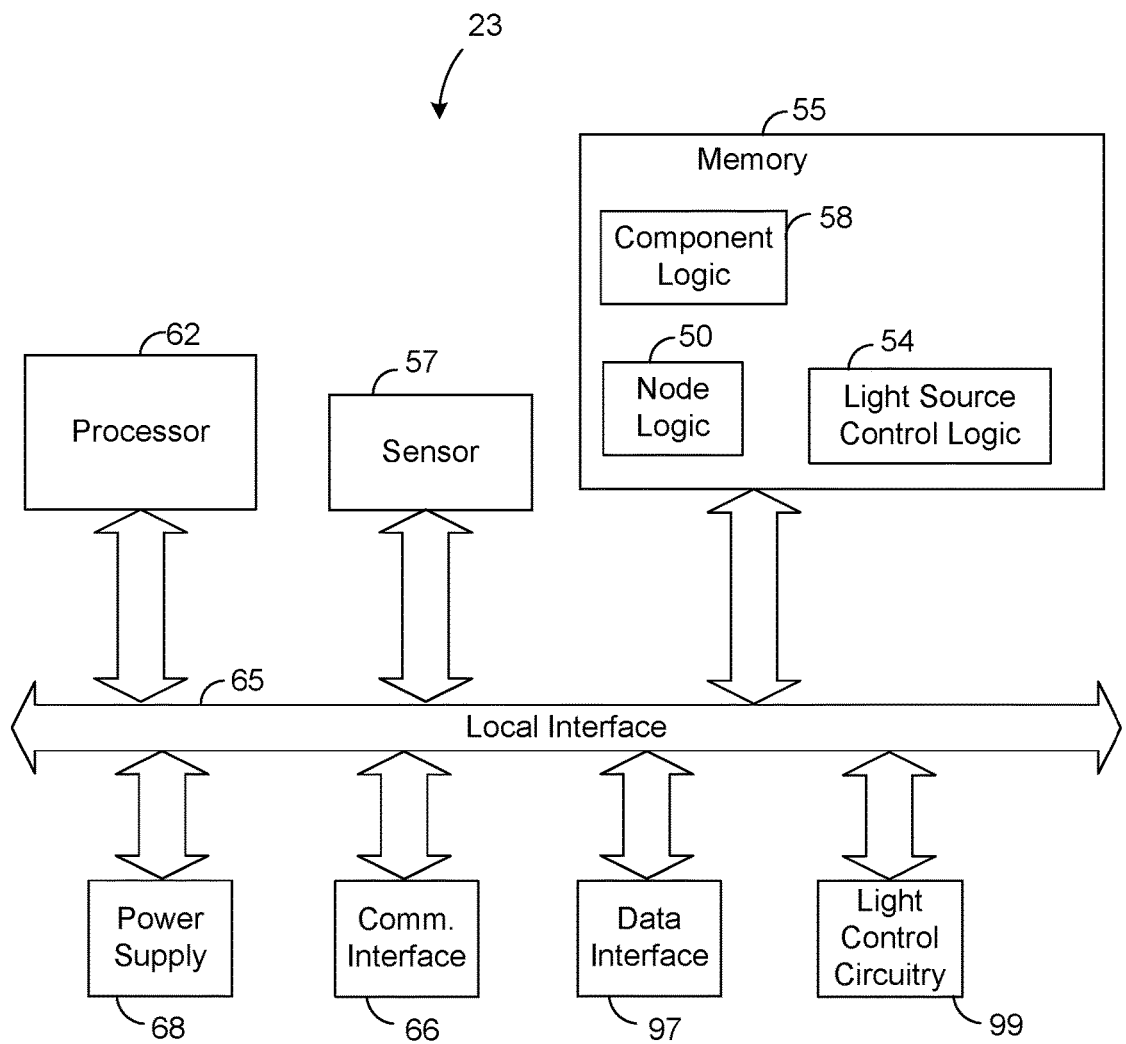
FIG. 2 is a block diagram showing an embodiment of a network node used with the control system.

FIG. 2 depicts an embodiment of one of the nodes used in network 20. Note that any of the other nodes may be configured similarly or identical to the node depicted by FIG. 2. The node 23 shown by FIG. 2 can include logic 50, referred to herein as "node logic," for generally controlling the operation of the node 23. The node 23 also includes logic 54, referred to herein as "light source control logic," for controlling the light sources 84 connected to the node 23, component logic 58 for controlling any component (e.g., camera 92 and/or lighting sensor 40) that may be connected to the node 23. In other embodiments, the component logic 58 can be combined with light source control logic 54 to control light sources 84 and/or other components. The node logic 50, component logic 58 and the light source control logic 54 may be implemented in software, firmware, hardware, or any combination thereof. In FIG. 2, the node logic 50, the component logic 58 and the light source control logic 54 are implemented in software and stored in memory 55. However, other configurations of the node logic 50, the component logic 58 and the light source control logic 54 are possible in other embodiments.

Note that the node logic 50, the component logic 58 and the light source control logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 23 includes at least one conventional processor 62, which includes processing hardware for executing instructions stored in the memory 55. As an example, the processor 62 may include a central processing unit (CPU) or a digital signal processor (DSP). The processor 62 communicates to and drives the other elements within the node 23 via a local interface 65, which can include at least one bus.

The node 23 also has a communication interface 66. The communication interface 66 includes a radio frequency (RF) radio or other device for communicating wirelessly. Using the communication interface 66, the node 23 may communicate with another node 21, 22, 24, 25, a camera 92, a lighting sensor 40, a light source 84 or a network access device 34.

The node 23 can have a power supply 68, which provides electrical power to the components of the node 23 and possibly to the light source 84, camera 92 and/or lighting sensor 40. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 23 to be independent of the external power component.

The node 23 can also have light control circuitry 99 (or a light driver) that is connected, either wired or wirelessly, to the light source 84 to control the light source 84. In one embodiment, light control circuitry 99 can control: the lighting state (e.g., the on-state or the off-state) of the light source 84; the dim setting (e.g., the brightness or lighting output, which may be a high intensity output or a low intensity output) of the light source 84; the position and/or orientation of the light source 84; the output color of the light source 84; the output direction of light from the light source and/or the position of the output aperture of the light source 84. The output aperture can be opened or closed to control the amount of light output by the light source 84. For example, the output aperture having a more closed position would limit the amount of light output by the light source 84, while a more open position for the output aperture would permit an increased light output by the light source 84. In the light source 84, the high intensity output can correspond to greater than 50% of the maximum brightness or intensity of the light source 84 and the low intensity output can correspond to less than 50% of the maximum brightness or intensity of the light source 84. If a node is connected to more than one light source 84 (e.g., node 23), then the light control circuitry 99 can either have separate circuits or drivers for each light source 84 or the light control circuitry 99 can use circuits or drivers that can control multiple light sources 84.

The light control circuitry 99 may include a switch and/or light driver through which current from power supply 68 is provided to the light source 84. Alternatively, the light control circuitry 99 may control a switch and/or light driver located near the light source 84 to permit current from a light source power supply to reach the light source 84. In one embodiment, the switch can be manually controlled and can be mounted in the vicinity of the light source 84, such as on the wall of a room containing the light source 84. The light source 84 can convert the current received through the switch into visible light for illuminating the area in close proximity to the light source 84. The light source control logic 54 can be used to control the light control circuitry 99 to obtain desired performance from the light source 84. For example, the light source control logic 54 can activate the switch in the light control circuitry 99 to turn on the light source 84 or increase the dim setting (e.g., brightness) of the light source 84 in response to a determination that a person has entered the room containing the light source 84. In addition, the node 23 can include a sensor 57 (e.g., a current or voltage sensor) to measure a parameter indicative of the power used by the light source 84. In one embodiment, the sensor 57 may be a separate component as shown in FIG. 2, but the sensor 57 may be incorporated into the light control circuitry 99 in other embodiments.

In one embodiment, nodes 23-25 of lighting modules 90 may be considered lighting controllers that can control the operation of the corresponding light sources 84 of the lighting modules. In other embodiments, the lighting modules 90 may have a separate lighting controller that includes the light source control logic 54, the light control circuitry 99 and sensor 57. The lighting controller of the lighting module 90 may then be in communication with a corresponding node 21-25 of network 20.

Figure 3:
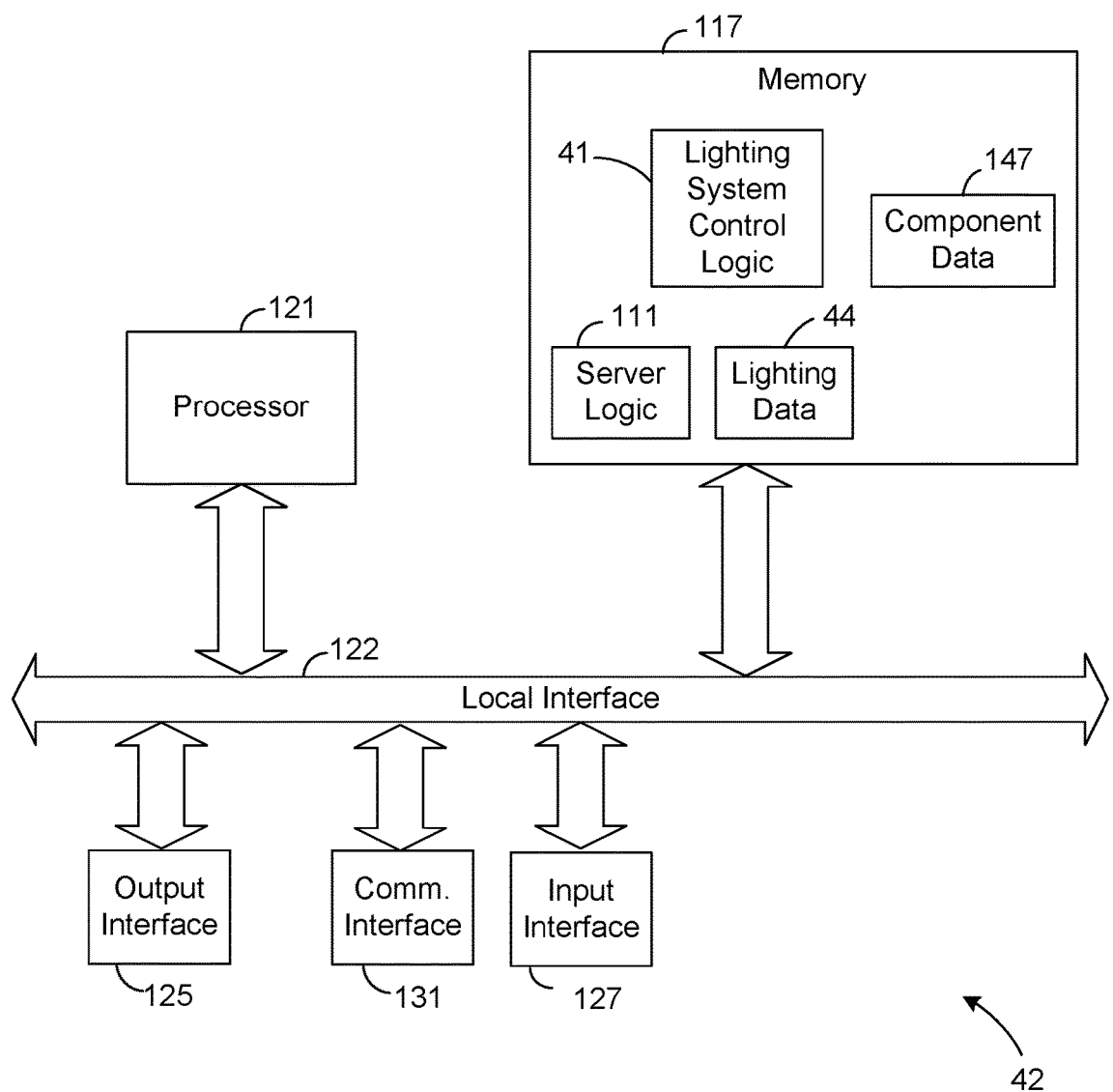
FIG. 3 is a block diagram showing an embodiment of a server used with the control system.

FIG. 3 shows an embodiment of the server 42. The server 42 can include logic 111, referred to herein as "server logic," for generally controlling the operation of the server 42, including communicating with the nodes 21-25 of the network 20. The server 42 includes logic 41, referred to herein as "lighting system control logic" to control the lighting modules 90 and the light sources 84. The server logic 111 and lighting system control logic 41 can be implemented in software, hardware, firmware or any combination thereof. In the server 42 shown in FIG. 3, the server logic 111 and lighting system control logic 41 are implemented in software and stored in memory 117 of the server 42. Note that the server logic 111 and lighting system control logic 41, when implemented in software, can be stored and transported on any non-transitory computer-readable medium for use by or in connection with an instruction execution apparatus that can fetch and execute instructions.

The server 42 can include at least one conventional processor 121, which has processing hardware for executing instructions stored in memory 117. As an example, the processor 121 may include a central processing unit (CPU) or a digital signal processor (DSP). The processor 121 communicates to and drives the other elements within the server 42 via a local interface 122, which can include at least one bus. Furthermore, an input interface 127, for example, a keypad, keyboard or a mouse, can be used to input data from a user of the server 42, and an output interface 125, for example, a printer, monitor, liquid crystal display (LCD), or other display apparatus, can be used to output data to the user. Further, a communication interface 131 may be used to exchange data with the network 36.

As shown by FIG. 3, lighting data 44 and component data 147 can be stored in memory 117 at the server 42. The component data 147 can include image data from cameras 92, sensor data from lighting sensors 40 for use and/or analysis by server logic 111 and/or lighting system control logic 41.

The lighting data 44 can indicate one or more parameters for each lighting module 90 in the system 15. In this regard, each lighting module 90 can be identified in the lighting data 44 by the module's respective network identifier for the network 20 (i.e., the network address for the node 23-25) or other unique identifier. For each lighting module 90, the lighting data 44 can identify the number of light sources 84 associated with the lighting module 90 and indicate an identifier for each light source 84. If a lighting module 90 is limited to a single light source 84 or a single light identifier, then the network identifier may be used as the light identifier. In one embodiment, the lighting data 44 can include one or more configurations for each light source 84 and/or lighting module 90. Each configuration of a light source 84 can include settings relating to one or more of the lighting state, the dim setting, the position and/or orientation, the output color, the output direction of light, and/or the position of the output aperture of the light source 84. In another embodiment, the lighting data 44 can include conversion data for each light source 84 (or group of similar light sources 84), such as a power profile, that correlates the lighting configuration of the light source 84 (e.g., the dim setting) to the power used by the light source 84. The server logic 111 can transmit messages with information relating to the lighting data 44 to the lighting modules 90 over the network 20. Additional information regarding the operation of a lighting control system is described in commonly-assigned U.S. Pat. No. 9,374,874, entitled "Lighting Control Systems and Methods," and granted on Jun. 21, 2016, which patent is incorporated herein by reference.

The lighting system control logic 41 can be used to control the lighting configuration and/or lighting conditions associated with the light sources 84 and/or the lighting modules 90. The lighting system control logic 41 controls the lighting modules 90 and light sources 84 according to the lighting data 44 and/or parameters provided in the lighting system control logic 41. The lighting system control logic 41 generates the appropriate instructions for the corresponding lighting modules 90 and light sources 84 to implement the selected lighting conditions from the lighting data 44. The lighting system control logic 41 can then transmit the appropriate instructions to the corresponding lighting modules 90 and light sources 84 over the network 20. Upon receiving the instructions from the lighting system control logic 41, the lighting modules 90 can implement the received instructions via the light source control logic 54 and light control circuitry 99 to obtain the desired output lighting from the light sources 84. In addition, the lighting system control logic 41 can be used to calculate the energy consumption of the lighting system and provide the energy consumption information to a user.

Figure 4:
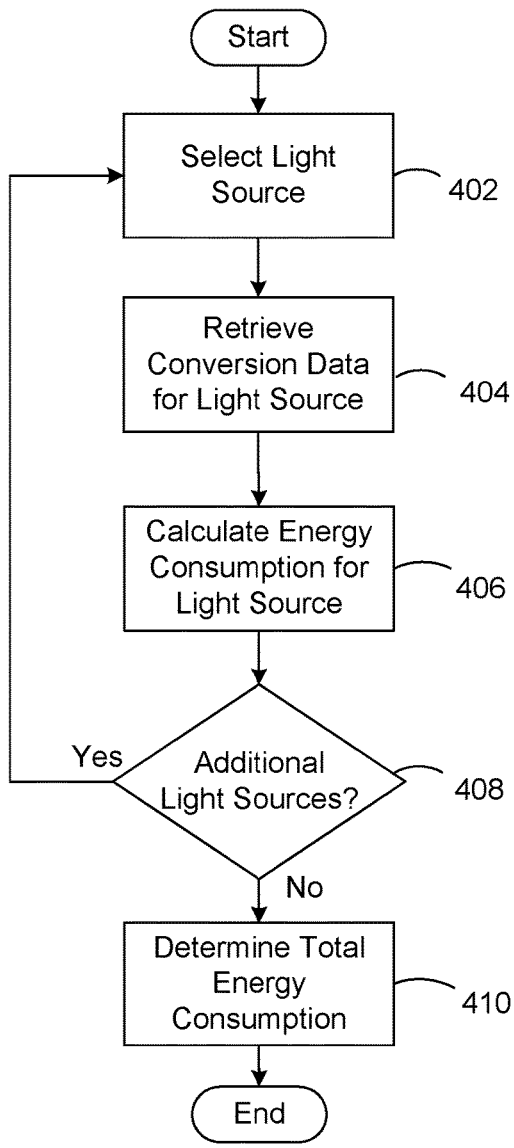
FIG. 4 is a flow chart showing an embodiment of a process for determining the energy consumption of a lighting system.

FIG. 4 is a flow chart showing an embodiment of a process for determining the energy consumption in a lighting system. The server computer 42 can determine the energy consumption for the lighting system or a portion of the lighting system (e.g., a light source 84 or a group of light sources 84 in a corresponding area covered by the lighting system) over a preselected time period (e.g., 1 day, 1 week, 1 month, etc.). The process begins with the server computer 42 (or site controller) selecting a light source of the lighting system or the portion of the lighting system (step 402). Conversion data (e.g., a power profile) for the selected light source 84 is retrieved from memory 117 (step 404). The conversion data for the selected light source 84 can be generated by the corresponding node (or lighting controller) of the lighting module 90 that controls the light source 84. The conversion data can be generated for the selected light source 84 prior to the initiation of the process of FIG. 4. In addition, the conversion data can be periodically updated in response to a predetermined schedule (e.g., once every month) or a predetermined event (e.g., startup of the lighting system, provisioning changes at the light source 84, or ambient environmental changes at the light source 84). In one embodiment, the conversion data can be generated in accordance with the process of FIG. 6 described below, but the conversion data may be generated by different processes in other embodiments.

After retrieving the conversion data, the server computer can then calculate the energy consumption for the selected light source over the preselected time period (step 406). In one embodiment, the energy consumption for the selected light source 84 can be determined in accordance with the process of FIG. 5 described below, but the energy consumption of the selected light source 84 may be determined by different processes in other embodiments. A determination is then made as to whether the energy consumption of additional light sources 84 has to be determined (step 408). If there are additional light sources 84 requiring an energy consumption calculation, the process returns to step 402 to select another light source. If there are not any additional light sources 84, the process proceeds to determine the total energy consumption for the lighting system or the subset of the lighting system (step 410) and the process ends. In one embodiment, the total energy consumption for the lighting system can be determined by adding the calculated energy consumption of each of the light sources in the lighting system (or the portion thereof), but the total energy consumption for the lighting system may be determined by different processes in other embodiments.

Figure 5:
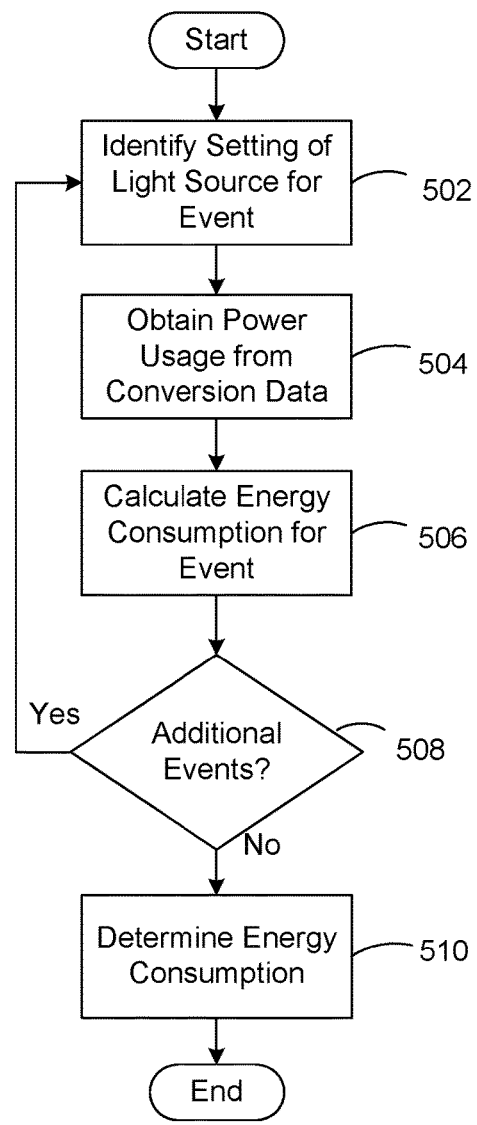
FIG. 5 is a flow chart showing an embodiment of a process for determining the energy consumption of a light source.

FIG. 5 is a flow chart showing an embodiment of a process for calculating the energy consumption of a selected light source 84. The server computer 42 can determine the energy consumption for each selected light source 84 over the preselected time period in order to determine the energy consumption of the lighting system or the portion of the lighting system. In one embodiment, the process of FIG. 5 can be used to complete step 406 in the process of FIG. 4. The process begins with the server computer 42 (or site controller) identifying a setting of a light source 84 for a lighting event (step 502).

The server computer 42 has knowledge of all of the lighting events that occur at the selected light source 84 as a result of the lighting events being initiated by the lighting system control logic 41 in response to predetermined events (e.g., activation of a wall switch or detection of a person in a room or area by a lighting sensor 40) or in accordance with a pre-programmed schedule (e.g., the light source is on from 6:00 am to 9:00 pm) in the lighting data 44. In one embodiment, a lighting event can correspond to a time period that the light source 84 is operated at a particular lighting configuration. For example, a lighting event may correspond to the operation of the light source 84 at a particular dim setting (e.g., a high-intensity output) for a setting time period. In one embodiment, the setting time period is less than the preselected time period, but may be equal to (or longer than) the preselected time period in other embodiments. The lighting event can have corresponding transitions to other lighting configurations (e.g., transition to an on-state, transition to an off-state, or transition to a different dim setting) at the beginning and ending of the lighting event.

After identifying a setting for the selected light source 84, the corresponding power usage associated with the setting for the light source 84 is obtained from the conversion data (step 504). In an embodiment, the conversion data can include the power usage of the light source 84 for different settings (e.g., lighting configurations) of the light source 84. The energy consumed by the selected light source 84 for the lighting event is then calculated (step 506) using the power usage data from the conversion data and the duration of (or the amount of time associated with) the lighting event. The process then determines whether there are additional lighting events (step 508) associated with the selected light source 84 for the preselected time period. If there are additional lighting events for the selected light source 84, the process returns to step 502 to identify another setting and lighting event for the selected light source 84. If there are no additional lighting events for the selected light source 84, the process determines the energy consumption for the selected light source 84 (step 510) and the process ends. The energy consumption for the selected light source can be determined by adding the calculated energy consumptions for the lighting events of the selected light source 84 during the preselected time period.

Figure 6:
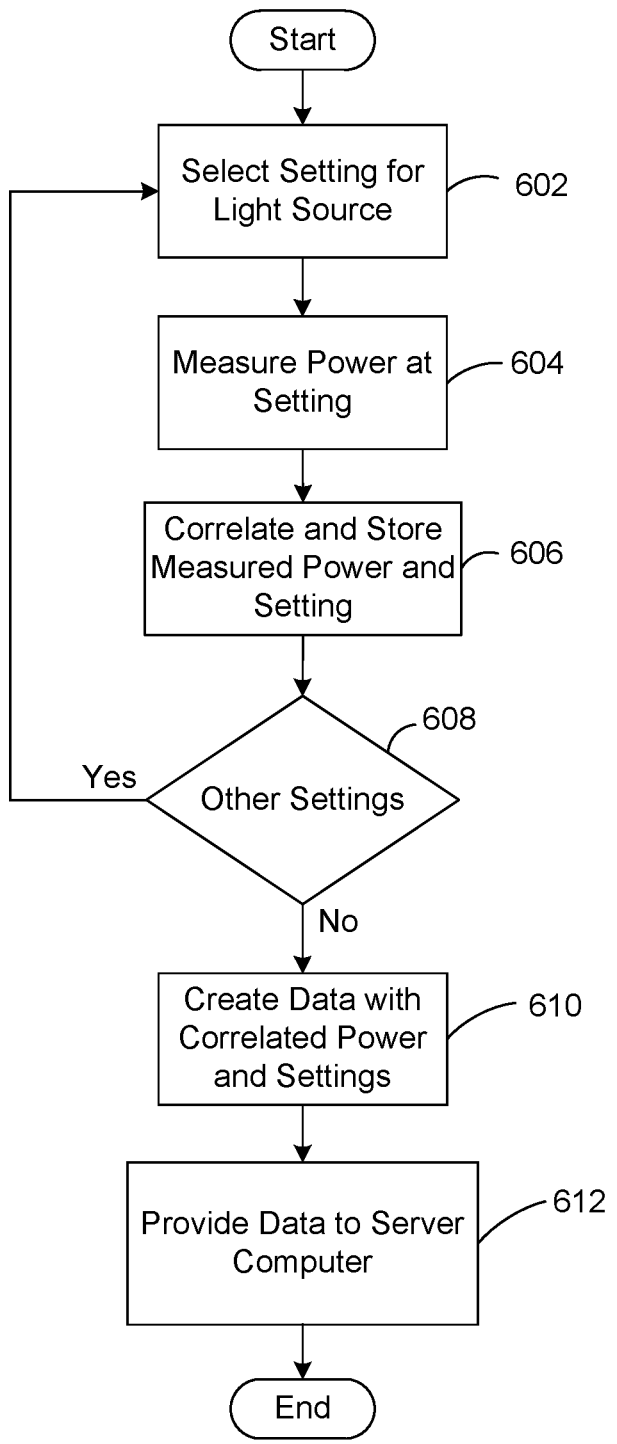
FIG. 6 is a flow chart showing an embodiment of a process for generating power conversion data for a light source.

FIG. 6 is a flow chart showing an embodiment of a process for generating conversion data (e.g., a power profile) for a light source 84 that can be used by a server computer 42 to determine the energy consumption of the light source 84. The node (or lighting controller) of the lighting module 90 used to control the light source 84 can generate the information or data relating to the power usage of the light source 84 for different settings (e.g., lighting configurations) of the light source 84. In one embodiment, the process of FIG. 6 can be used to provide the conversion data retrieved in step 404 in the process of FIG. 4. The process begins with the corresponding node (or lighting controller) of the lighting module 90 for the light source 84 selecting a setting for the light source (step 602). The setting (e.g., lighting configuration) for the light source 84 can be one of the available settings available for the light source 84 in lighting data 44 or lighting system control logic 41. The setting for the light source 84 can include a dim setting for the light source 84 in one embodiment. In other embodiments, the setting for the light source 84 can also include the lighting state, the position and/or orientation of the light source 84, the output color of the light source 84, the output direction of light from the light source, and/or the position of the output aperture of the light source 84.

Once the node for the light source 84 has selected (and implemented) a lighting configuration for the light source 84, the sensor 57 can measure a parameter indicative of the power used by the light source 84 (step 604). The power used by the light source 84 can be measured for a predetermined time period (e.g., 1 second, 1 minute, etc.) by sensor 57. The measured power for the light source 84 can be correlated with the setting for the light source 84 and stored in memory 55 (step 606). The node for the light source 84 can then determine whether there are additional settings for the light source 84 (step 608).

If there are additional settings for the light source 84, the process returns to step 602 to identify another setting for the light source 84. If there are not any other settings for the light source 84, the data is organized by correlating settings (e.g., lighting configurations which may include dim settings) and power usages for the light source 84 (step 610). In one embodiment, the data can be organized into a table, but may be organized in different formats (e.g., a power profile) in other embodiments. The data may be condensed in one embodiment if multiple settings have the same power usage for the light source 84 to simplify the use of the data and reduce the storage requirements in memory 55. The data can then be sent by the corresponding node for the light source 84 to the server computer 42 (step 612). The server computer 42 can then use the power usage measurements to determine the energy consumption of the light source 84 as described above.

Thus, using the techniques described above, the server 42 may be configured to track power consumption of each light source 84 over time without the nodes 23-25 having to track and report such consumption, thereby reducing the amount of messaging that occurs on the wireless network 20. In this regard, for a given node 23-25 coupled to a light source 84, the node 23-25 may be configured to define power data indicative of a power profile of the light source 84. As an example, the node 23-25 may adjust the lighting state of the light source 84 (e.g., change the dim setting) over a range of lighting configurations and, based on readings by the sensor 57 record the power consumed by the light source 84 for each lighting configuration (e.g., dim setting). The node 23-25 may take a sufficient number of samples across a sufficiently large range of lighting configurations (e.g., dim settings) so that the power profile defined by the power data can be used to accurately calculate the power consumed by the light source 84 for any dim setting using interpolation or some other techniques. As an example, by performing a curve fit on the samples defined by the power data, it may be possible to use the resulting curve to determine the power consumed by the light source 84 for any possible dim setting.

After determining the data for the power profile, the node 23-25 may be configured to transmit the power data through the wireless network 20 to the server 42. From time-to-time, the node 23-25 may be configured to perform the aforementioned process for determining the power profile so that the power profile at the server 42 may be updated to account for performance variations of the light source 84 over time.

As described above, the server 42 is configured to transmit commands for controlling the lighting states of the light source 84 to the node 23-25 through the wireless network 20. Each of these commands may include a dim setting that is used by the node 23-25 to adjust the brightness of the light illuminated by the light source 84 in response to the command. As an example, the node 23-25 may adjust the input current of the light source 84 so that the brightness of the light illuminated by the light source 84 is consistent with the dim setting in the command.

Since the server 42 is controlling the lighting states of the light source 84, the server 42 is aware of the lighting states without requiring the node 23-25 to report the lighting states to the server. Over time, the server 42 may be configured to track the lighting states based on the dim settings in the commands that the server 42 transmits to the node 23-25 without requiring the node 23-25 to report information about the lighting states to the server 42. As an example, for each dim setting transmitted in a command to the node 23-25, the server 42 may store the value of the dim setting and correlate such value with data indicative of the amount of time that the light source 84 remained at such dim setting (e.g., until the dim setting was changed to a new value as instructed by the server 42). Using such information in conjunction with the light source's power profile stored by the server 42, the server 42 can calculate the amount of power consumed by the light source 84 over time without requiring the node 23-25 to measure or report such consumption, thereby decreasing the overall amount of traffic on the wireless network.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A lighting control system, comprising:
   a plurality of nodes communicatively coupled in a network;
   a plurality of lighting modules, each lighting module of the plurality of lighting modules comprising a node of the plurality of nodes and at least one light source connected to the node, the at least one light source operable to generate visible light to illuminate an area, wherein each lighting module of the plurality of lighting modules is configured to generate data for the at least one light source, the data including power usages of the at least one light source for corresponding lighting configurations of the at least one light source; and
   a server communicatively coupled to the plurality of nodes, the server configured to receive, from each of the lighting modules of the plurality of lighting modules, the data for the at least one light source generated by the lighting module, the server configured to determine an energy consumption for the at least one light source of one or more lighting modules of the plurality of lighting modules based on the data for the at least one light source provided by the one or more lighting modules.

2. The lighting control system of claim 1, wherein the server is configured to identify at least one lighting event for the at least one light source of the one or more lighting modules, the at least one lighting event having an event lighting configuration for the at least one light source, and the server is configured to retrieve the power usage for the at least one light source during the at least one lighting event corresponding to the event lighting configuration and determine the energy consumption for the at least one light source of the one or more lighting modules based on the retrieved power usage for the at least one light sources during the at least one lighting event.

3. The lighting control system of claim 2, wherein the event lighting configuration includes a dim setting for the at least one light source.

4. The lighting control system of claim 2, wherein the at least one lighting event includes a lighting event associated with at least one of activation of a wall switch, activation of a photocell, or activation of a motion sensor.

5. The lighting control system of claim 2, wherein the at least one lighting event occurs in response to control instructions to the lighting module from the server, wherein the control instructions include the event lighting configuration.

6. The lighting control system of claim 1, wherein each lighting module of the plurality lighting modules is configured to generate the data for the at least one light source by implementing a plurality of lighting configurations at the at least one light source and measuring the power usage of the at least one light source for each of the plurality of lighting configurations.

7. The lighting control system of claim 1, wherein each lighting module of the plurality lighting modules is configured to periodically generate new data for the at least one light source and provide the new data to the server via the network.

8. The lighting control system of claim 7, wherein each lighting module of the plurality lighting modules is configured to generate the new data in response to one or more of a predetermined schedule, a startup of the lighting control system, provisioning changes at the at least one light source, or ambient environmental changes at the at least one light source.

9. A method for determining energy consumption by a lighting system, the method comprising:
generating, by a lighting module, data for a light source, wherein the light source is operable to generate visible light to illuminate an area and the data includes a plurality of power usages for the light source corresponding to a plurality of lighting configurations for the light source;
communicating, by the lighting module, the generated data for the light source to a server via a network, wherein the network comprising a plurality of nodes communicatively coupled, the lighting module comprising a node of the plurality of nodes, and the light source being coupled to the node of the lighting module;
determining, by the server, an energy consumption of the light source based on the data for the light source provided by the lighting module; and
calculating, by the server, the energy consumption of the lighting system based on the determined energy consumption of the light source.

10. The method of claim 9, wherein the determining the energy consumption of the light source includes:
Identifying, by the server, at least one lighting event for the light source, the at least one lighting event having an event lighting configuration for the light source;
retrieving, by the server, the power usage for the light source corresponding to the event lighting condition in the data; and
determining the energy consumption for the light source during the at least one lighting event based on the retrieved power usage.

11. The method of claim 10, wherein the identifying the at least one lighting event includes determining a dim setting for the light source associated with the event lighting configuration.

12. The method of claim 10, wherein the identifying the at least one lighting event includes determining an activation of at least one of a wall switch, a photocell, or a motion sensor.

13. The method of claim 10, wherein the identifying the at least one lighting event includes identifying a control instruction to the lighting module from the server, wherein the control instruction includes the event lighting configuration.

14. The method of claim 9, wherein the generating the data includes:
implementing a lighting configuration of the plurality of lighting configurations at the light source;
measuring the power usage of the light source at the implemented lighting configuration; and
storing information related to the implemented lighting configuration and the measured power usage.

15. The method of claim 14, wherein the generating the data further includes repeating, for each lighting configuration of the plurality of lighting configurations, the implementing the lighting configuration, the measuring the power usage of the light source, and the storing information.

16. The method of claim 9, further comprising periodically repeating the generating data for the light source and the communicating the generated data for the light source to the server.

17. The method of claim 16, wherein the periodically repeating occurs in response to one or more of a predetermined schedule, a startup of the lighting system, provisioning changes at the light source, or ambient environmental changes at the light source.

18. The method of claim 9, further comprising:
repeating, for each light source in the lighting system, the generating the data for the light source, the communicating the generated data for the light source and the determining the energy consumption of the light source; and
wherein the calculating the energy consumption of the lighting system includes calculating the energy consumption for the lighting system with the determined energy consumptions for the lights sources in the lighting system.

19. A lighting control system, comprising:
a plurality of nodes communicatively coupled in a network;
a plurality of lighting modules, each lighting module of the plurality of lighting modules comprising a node of the plurality of nodes and at least one light source connected to the node, the at least one light source operable to generate visible light to illuminate an area, wherein each lighting module of the plurality lighting modules is configured to measure a power usage of the at least one light source; and
a server communicatively coupled to the plurality of nodes, the server configured to receive a plurality of measured power usages from the plurality of lighting modules, the server configured to determine an energy consumption for the plurality of lighting modules based on the received plurality of measured power usages from the plurality of lighting modules, and wherein the server is configured to reduce traffic in the network by receiving the plurality of measured power usages from the plurality of lighting modules in corresponding data that correlates power usages of the at least one light source for a corresponding lighting module with lighting configurations of the at least one light source for the corresponding lighting module such that the server determines energy consumption with the corresponding data and information regarding lighting configurations of the light sources of the plurality of lighting modules located at the server.

20. The lighting control system of claim 19, wherein the server is configured to send instructions to each lighting module of the plurality of lighting modules to prevent the plurality of lighting modules from sending messages to the server that include a power usage measurement for the at least one light source based on operation of the at least one light source.

21. A lighting control system, comprising:
- a lighting controller coupled to a light source for controlling a brightness of light illuminated by the light source;
- a sensor configured to measure a parameter indicative of power consumed by the light source, wherein the lighting controller is configured to determine, based on power data from the sensor, a power profile of the light source, the power profile indicative of power consumed by the light source for a plurality of lighting configurations of the light source;
- a wireless network, wherein the lighting controller is configured to transmit the power profile through the wireless network; and
- a server configured to communicate with the lighting controller through the wireless network, the server configured to receive the power profile and to transmit commands having dim settings to the lighting controller through the wireless network, wherein the lighting controller is configured to control the brightness of the light illuminated by the light source based on the dim settings, the server further configured to track lighting configurations of the light source over time based on the dim settings, wherein the server is configured to calculate a value indicative of power consumption of the light source over time based on the tracked lighting configurations and the power profile.

\* \* \* \* \*